US009609493B2

United States Patent
Doherty

(10) Patent No.: US 9,609,493 B2
(45) Date of Patent: Mar. 28, 2017

(54) SMARTPHONE CONFERENCING SYSTEM AND METHOD OF OPERATING SAME

(71) Applicant: Snaptalk Limited, Dublin (IE)

(72) Inventor: Gavan Doherty, Dublin (IE)

(73) Assignee: 247Meeting (Ireland) Limited, Dublin (IE)

(*) Notice: Subject to any disclaimer, the term of this patent is extended or adjusted under 35 U.S.C. 154(b) by 0 days.

(21) Appl. No.: 14/435,990

(22) PCT Filed: Oct. 16, 2013

(86) PCT No.: PCT/EP2013/071651
§ 371 (c)(1),
(2) Date: Apr. 15, 2015

(87) PCT Pub. No.: WO2014/060487
PCT Pub. Date: Apr. 24, 2014

(65) Prior Publication Data
US 2015/0281925 A1 Oct. 1, 2015

(30) Foreign Application Priority Data

Oct. 16, 2012 (GB) .................................. 1218521.1

(51) Int. Cl.
*H04W 4/16* (2009.01)
*H04M 3/56* (2006.01)
(Continued)

(52) U.S. Cl.
CPC ............... *H04W 4/16* (2013.01); *H04M 3/38* (2013.01); *H04M 3/56* (2013.01); *H04M 3/568* (2013.01);
(Continued)

(58) Field of Classification Search
CPC ........... H04W 4/16; H04M 3/38; H04M 3/56; H04M 3/568
(Continued)

(56) References Cited

U.S. PATENT DOCUMENTS 6,505,039 B1  1/2003  Boatwright
7,082,191 B1*  7/2006  Dickens ................ H04M 1/673
                                                              379/128
(Continued)

OTHER PUBLICATIONS

International Search Report and Written Opinion from related PCT Application Serial No. PCT/EP2013/071651, dated Jan. 29, 2014, pp. 1-9.
(Continued)

*Primary Examiner* — Kamran Afshar
*Assistant Examiner* — Ather Mohiuddin
(74) *Attorney, Agent, or Firm* — Brian J. Colandreo; Michael T. Abramson; Holland & Knight LLP

(57) ABSTRACT

This invention relates to a smartphone conferencing system (1), a dial-out and permissions rating engine (DPRE) (17) for use in the system, and a method of handling a smartphone conference call between a smartphone user and a plurality of conference call participants (5). The system and method both incorporate a DPRE (17) which analyzes the conference call establishment requests and determines if a request is valid or if a request is invalid based on call dial-out history. The system and method will obviate many of the delays in establishing a smartphone conference call and will prevent fraud should the users lose their smartphone (3).

20 Claims, 3 Drawing Sheets

(51) Int. Cl.
*H04M 3/38* (2006.01)
*H04M 7/00* (2006.01)

(52) U.S. Cl.
CPC .... *H04M 7/0078* (2013.01); *H04M 2203/551* (2013.01); *H04M 2203/556* (2013.01); *H04M 2203/6027* (2013.01); *H04M 2203/6045* (2013.01)

(58) Field of Classification Search
USPC ........................................................ 455/416
See application file for complete search history.

(56) References Cited

U.S. PATENT DOCUMENTS

| | | | | |
|---|---|---|---|---|
| 7,436,785 | B1* | 10/2008 | McMullen | H04M 3/42008 |
| | | | | 370/261 |
| 2001/0019604 | A1* | 9/2001 | Joyce | G06Q 20/00 |
| | | | | 379/114.2 |
| 2005/0197097 | A1* | 9/2005 | Mohler | H04M 3/42314 |
| | | | | 455/404.2 |
| 2007/0156659 | A1 | 7/2007 | Lim | |
| 2009/0094029 | A1* | 4/2009 | Koch | H04M 3/42221 |
| | | | | 704/246 |
| 2011/0231396 | A1* | 9/2011 | Dhara | H04L 12/1818 |
| | | | | 707/731 |
| 2011/0268418 | A1* | 11/2011 | Jones | H04L 12/1831 |
| | | | | 386/200 |
| 2011/0270609 | A1* | 11/2011 | Jones | H04M 3/56 |
| | | | | 704/235 |
| 2012/0321062 | A1* | 12/2012 | Fitzsimmons | H04L 65/4015 |
| | | | | 379/142.17 |
| 2013/0017806 | A1* | 1/2013 | Sprigg | H04M 1/66 |
| | | | | 455/411 |
| 2014/0232817 | A1* | 8/2014 | Jones | H04M 3/568 |
| | | | | 348/14.08 |

OTHER PUBLICATIONS

International Preliminary Report on Patentability from related PCT Application Serial No. PCT/EP2013/071651, dated Jan. 29, 2014, pp. 1-6.

* cited by examiner

SMARTPHONE CONFERENCING SYSTEM AND METHOD OF OPERATING SAME

CROSS-REFERENCE TO RELATED APPLICATIONS

The subject application is a U.S. National Stage application of International Application No. PCT/EP2013/071651, filed on 16 Oct. 2013, which claims the priority of Great Britain Patent Application No. 1218521.1, filed 16 2012. The contents of both applications are herein incorporated by reference in their entirety.

TECHNICAL FIELD

This invention relates to a smartphone conferencing system for handling a conference call between a smartphone and a plurality of conference call participants over a communications network. The invention further relates to a method of handling a smartphone conference call and a dial-out and permissions rating engine (DPRE) for use in the method.

BACKGROUND ART

Smartphone conferencing has in many respects simplified the manner in which a conference call can be made. Instead of having to contact each of the intended conference call participants well in advance of the conference call and provide them all with a dial-up number appropriate for their jurisdiction and a dial-in code, a smartphone user may simply install a conferencing call application ("app") onto their smartphone and use that smartphone conferencing call app to make the conference call. The smartphone user simply selects a number of conference call participants from a contact list on their smartphone through the conferencing call app, and thereafter the smartphone calls each of the conference call participants and initiates the conference call between the smartphone user and the plurality of conference call participants. In this way, conference calls can be set up with little or no warning and this is particularly beneficial when it is necessary for a group of people to partake in a conference call at short notice.

There are however problems with the known smartphone conferencing call apps. For example, due to the fact that the smartphone dials out to all of the conference call participants, all of the conference call costs are borne by the smartphone user. Importantly though, irrespective of the added cost to the smartphone user for legitimate conference calls, there is also an increased risk of significant loss if the smartphone user should lose their smartphone and it were to fall into the hands of an unscrupulous individual, or indeed if the smartphone was stolen by such an individual. That individual could theoretically make calls to a large number of their friends or associates or otherwise run up significant costs before the smartphone owner recognised their loss and reported the smartphone missing.

Furthermore, the service provider of the smartphone conferencing call app also has a potential liability in the case of fraud and therefore the service providers are often unwilling, or at best reluctant, to extend credit to third parties. The smartphone users must usually contact the service provider in advance of any potentially expensive conference calls which diminishes the main benefit of the smartphone conferencing call app, namely that the conference call can be set up at very short notice. This is highly disadvantageous.

It is an object of the present invention to provide a smartphone conferencing system and method of handling a smartphone conference call that overcomes at least some of the disadvantages of the known systems and methods.

SUMMARY OF INVENTION

According to the invention there is provided a smartphone conferencing system for handling a conference call between a smartphone and a plurality of conference call participants over a communications network, the smartphone conferencing system comprising:

a smartphone server for receiving a conference call establishment request from a smartphone containing contact details relating to a plurality of conference call participants and establishing a communication link through the communication network between the smartphone and each of the conference call participants;

an audio server for splicing the audio feed from each of the smartphone and the conference call participants into a conference call feed and delivering that conference call feed to each of the smartphone and the conference call participants;

a database server for storage of data relating to the smartphone users account and data relating to one or more of the smartphones, the call participants, a plurality of call tariffs, and the conference call feed thereon; and a dial-out and permissions rating engine (DPRE) in communication with both the database server and the smartphone server, the DPRE comprising:

means to receive the conference call establishment request forwarded from the smartphone server;

means to analyse the conference call establishment request to detect valid conference call requests and invalid conference call requests including means to compare a conference call dial-out history of the smartphone user with the conference call establishment request; and means to instruct the smartphone server to accept and process or reject the conference call establishment request based on the analysis of the conference call establishment request.

By having such a system, there will be an automatic, real time, intelligent decision making entity, provided by way of the DPRE, which is able to analyse the conference call establishment requests and determine whether the requests are valid or potentially fraudulent, invalid requests. The DPRE will have a method of evaluating the conference call establishment request whereby it can make a determination on the validity or otherwise of the conference call establishment request. For example, the DRPE can examine the conference call history of the smartphone user and determine whether the present conference call establishment request matches a pre-existing pattern of conference call establishment requests or whether it might be considered abnormal and invalid. By having such a system, there will be less delay experienced by the smartphone user and a degree of security is built in for both the smartphone user and the conferencing call app service provider.

In one embodiment of the invention there is provided a smartphone conferencing system for facilitating a conference call in which the means to compare the conference call dial-out history of the smartphone user with the conference call establishment request further comprises means to compare the conference call participants listed in the conference call establishment request with conference call participants from previously executed conference calls made by the smartphone. In this way, if the smartphone user attempts to instigate a conference call and one or more of the conference call participants listed in the conference call establishment request were previously called by the smartphone user and that call was paid for, this may be sufficient for the DPRE to allow the conference call to proceed. If none of the conference call participants were previously contacted, this may cause an alert or a determination that the conference call establishment request is invalid.

In one embodiment of the invention there is provided a smartphone conferencing system for facilitating a conference call in which the means to compare the conference call dial-out history of the smartphone user with the conference call establishment request further comprises means to compare the time of the conference call establishment request with the time of previously executed conference calls made by the smartphone. This is seen as useful as a call made at a time that is atypical of the user is a strong indicator that the call may be fraudulent, In one embodiment of the invention there is provided a smartphone conferencing system for facilitating a conference call in which the means to analyse the conference call establishment request comprises means to compare the location of the plurality of conference call participants with a location on a prohibited or known high risk location list. This is a particularly effective way of preventing fraudulent calls in particular. Certain jurisdictions are known telecoms fraud countries and other jurisdictions are notoriously expensive to call. By preventing calls to these jurisdictions except in certain circumstances, the incidences of fraud and damage caused by fraud can be reduced.

In one embodiment of the invention there is provided a smartphone conferencing system for facilitating a conference call as claimed in any preceding claim in which the means to analyse the conference call establishment request comprises: means to score each of a plurality of conference call establishment request metrics; means to combine the scores of the plurality of conference call establishment request metrics; and means to compare the combined scores of the plurality of conference call establishment request metrics to a threshold value.

This is seen as a particularly suitable way of analysing the conference call establishment request. By scoring a plurality of conference call establishment request metrics and thereafter combining the scores prior to comparing the combined scores against a threshold value, it is envisaged that more valid calls that would heretofore have been stopped by the known methods and systems will be passed as valid, resulting in an improved user experience and increased revenue generation. This is due to a richer, more comprehensive analysis of the conference call establishment request as opposed to the very rigid systems and methods known in the art.

In one embodiment of the invention there is provided a smartphone conferencing system for facilitating a conference call in which the means to analyse the conference call establishment request comprises means to weight each of the conference call establishment request metrics.

In one embodiment of the invention there is provided a dial-out and permissions rating engine (DPRE) for use in a smartphone conferencing system for authorizing a conference call between a smartphone and a plurality of conference call participants over a communications network, the DPRE comprising:

means to receive a conference call establishment request forwarded from a smartphone server;

means to analyse the conference call establishment request to detect valid conference call requests and invalid conference call requests including means to compare a conference call dial-out history of the smartphone user with the conference call establishment request; and means to instruct the smartphone server to accept and process or reject the conference call establishment request based on the analysis of the conference call establishment request.

In one embodiment of the invention there is provided a DPRE in which the means to compare the conference call dial-out history of the smartphone user with the conference call establishment request further comprises means to compare the conference call participants listed in the conference call establishment request with conference call participants from previously executed conference calls made by the smartphone.

In one embodiment of the invention there is provided a DPRE in which the means to compare the conference call dial-out history of the smartphone user with the conference call establishment request further comprises means to compare the time of the conference call establishment request with the time of previously executed conference calls made by the smartphone.

In one embodiment of the invention there is provided a DPRE in which the means to analyse the conference call establishment request comprises means to compare the location of the plurality of conference call participants with a location on a prohibited location list.

In one embodiment of the invention there is provided a DPRE in which the means to analyse the conference call establishment request comprises: means to score each of a plurality of conference call establishment request metrics; means to combine the scores of the plurality of conference call establishment request metrics; and means to compare the combined scores of the plurality of conference call establishment request metrics to a threshold value.

In one embodiment of the invention there is provided a DPRE as claimed in claim 11 in which the means to analyse the conference call establishment request comprises means to weight each of the conference call establishment request metrics.

In one embodiment of the invention there is provided a method of handling a smartphone conference call between a smartphone and a plurality of conference call participants over a communications network, the method comprising the steps of:

a smartphone server receiving a conference call establishment request from a smartphone;

the smartphone server passing the conference call establishment request on to a dial-out and permissions rating engine (DPRE);

the DPRE analysing the conference call establishment request to detect whether the conference call establishment request is a valid conference call request or an invalid conference call request;

the DPRE instructing the smartphone server to accept and process or reject the conference call establishment request depending on whether the conference call establishment request is a valid conference call request or an invalid conference call request: and in which the step of analysing the conference call establishment request comprises comparing a conference call dial-out history of the smartphone user with the conference call establishment request.

This is seen as a particularly effective method of handling a smartphone conference call that will ensure that many fraudulent calls will be captured in an unobtrusive manner but at the same time many valid calls will not be prevented or delayed. In this way, the benefits of the smartphone conferencing systems and in particular short notice conference calling can be retained while at the same time enhancing the security of the system. Furthermore, this is a fast and efficient way of detecting whether or not a call is valid or potentially fraudulent and invalid. Effectively, usage patterns of the smartphone user can be analysed and compared with previous calling patterns to determine whether or not the call should proceed.

In one embodiment of the invention there is provided a method of handling a smartphone conference call in which the step of comparing the conference call dial-out history of the smartphone user with the conference call establishment request further comprises comparing the conference call participants listed in the conference call establishment request with conference call participants from previously executed conference calls made by the smartphone. By having such a method, if the smartphone user attempts to initiate a conference call with a number of participants that have previously been on a conference call that has been paid for, the conference call establishment request will be considered to be valid and will be allowed to proceed. Indeed, if one or more of the participants listed in the conference call establishment request were previously contacted by the smartphone user in a conference call that was subsequently paid for, this may be sufficient for the request to be considered valid.

In one embodiment of the invention there is provided a method of handling a smartphone conference call in which the step of comparing the conference call dial-out history of the smartphone user with the conference call establishment request further comprises comparing the time of the conference call establishment request with the time of previously executed conference calls made by the smartphone. In addition to the aforementioned, by comparing the time of the conference call establishment request with the time of previously executed conference calls made by the smartphone, the method may detect whether or not the conference call request is being made at an abnormal time of day compared with the history of conference calls made by the smartphone. If the call is being made at an abnormal time of day compared to the previous calls, this may be used as an indicator that the call may be fraudulent.

In one embodiment of the invention there is provided a method of handling a smartphone conference call in which the step of analysing the conference call establishment request comprises comparing a conference call dial-out history of the smartphone user's known associates with the conference call establishment request. The smartphone user may be part of a team or company structure and it is possible to cross-reference the contacts and countries that are dialed by other personnel in the team or company structure and consider the conference call establishment request to be valid if the same or similar parties or countries are being contacted by the smartphone user's team or fellow employees.

In one embodiment of the invention there is provided a method of handling a smartphone conference call in which the step of comparing the conference call dial-out history of the smartphone user's known associates with the conference call establishment request further comprises comparing the conference call participants listed in the conference call establishment request with conference call participants from previously executed conference calls made by the smartphone user's known associates.

In one embodiment of the invention there is provided a method of handling a smartphone conference call in which the step of analysing the conference call establishment request further comprises comparing the location of the plurality of conference call participants with a location on a prohibited or known high risk location list.

In one embodiment of the invention there is provided a method of handling a smartphone conference call in which the step of rejecting a conference call establishment request comprises connecting less than all of the conference call participants in a conference call. It may be desirable to not prohibit the establishment of a conference call if only some of the parties to that conference call would be deemed prohibited. Instead, the conference call may be initiated for all of the other conference call participants with the exception of the participant that is prohibited or based in a foreign jurisdiction (or known high risk location). In those instances, it may be possible to transmit a message to the participant that has been refused access to the call requesting them to call into the call using a given number and access code but at their own expense.

In one embodiment of the invention there is provided a method of handling a smartphone conference call in which the step of the DPRE analysing the conference call establishment request to detect whether the conference call establishment request is a valid conference call request or an invalid conference call request comprises the steps of:
    scoring each of a plurality of conference call establishment request metrics;
    combining the scores of the plurality of conference call establishment request metrics;
    comparing the combined scores of the plurality of conference call establishment request metrics to a threshold value.

This is seen as a particularly useful aspect of the present invention. By scoring a plurality of conference call establishment metrics, combining the scores and thereafter comparing the combined scores to a threshold value, a more accurate method of valid call detection will be provided. This will enable more valid calls to be processed thereby improving customer satisfaction and increasing revenue generation. One problem with the known methods is that they rigidly apply fixed rules. This inflexible approach leads to many valid conference call attempts being rejected. The present invention proposes a more flexible approach in which the conference call establishment requests are each rated according to their metrics and their rating is then used to determine whether or not the call should be allowed to proceed.

In one embodiment of the invention there is provided a method of handling a smartphone conference call in which the method comprises the initial step of weighting each of the conference call establishment request metrics.

In one embodiment of the invention there is provided a method of handling a smartphone conference call comprising the step of the DPRE transmitting an account top-up notification to a smartphone during a conference call. This is seen as a particularly useful embodiment of the invention. Effectively, the method will operate as a pay-as-you-go service with the smartphone users purchasing credit to use in the conferencing call app. This will limit the potential loss to the smartphone user if they lose their phone and will also limit the potential loss to the service provider as the loss will be limited to the credit in the smartphone user's account. The DPRE can inform the smartphone user that there credit is running low and that it is necessary for them to purchase more credit. This will ensure that calls are not dropped inadvertently for pay-as-you-go customers. Preferably, the notification will provide a link to the App store to allow the smartphone user top up their account practically instantaneously in the simplest fashion.

In one embodiment of the invention there is provided a method of handling a smartphone conference call comprising the step of the DPRE receiving an account top-up order from a smartphone during a conference call. This is also particularly preferred as the DPRE will be able to oversee the topping up of a smartphone user's account and will ensure that a conference call is not dropped mid-way through the conference call.

BRIEF DESCRIPTION OF THE DRAWINGS

The invention will now be more clearly understood from the following description of some embodiments thereof given by way of example only with reference to the accompanying drawings, in which:—

DETAILED DESCRIPTION OF THE DRAWINGS

Figure 1:
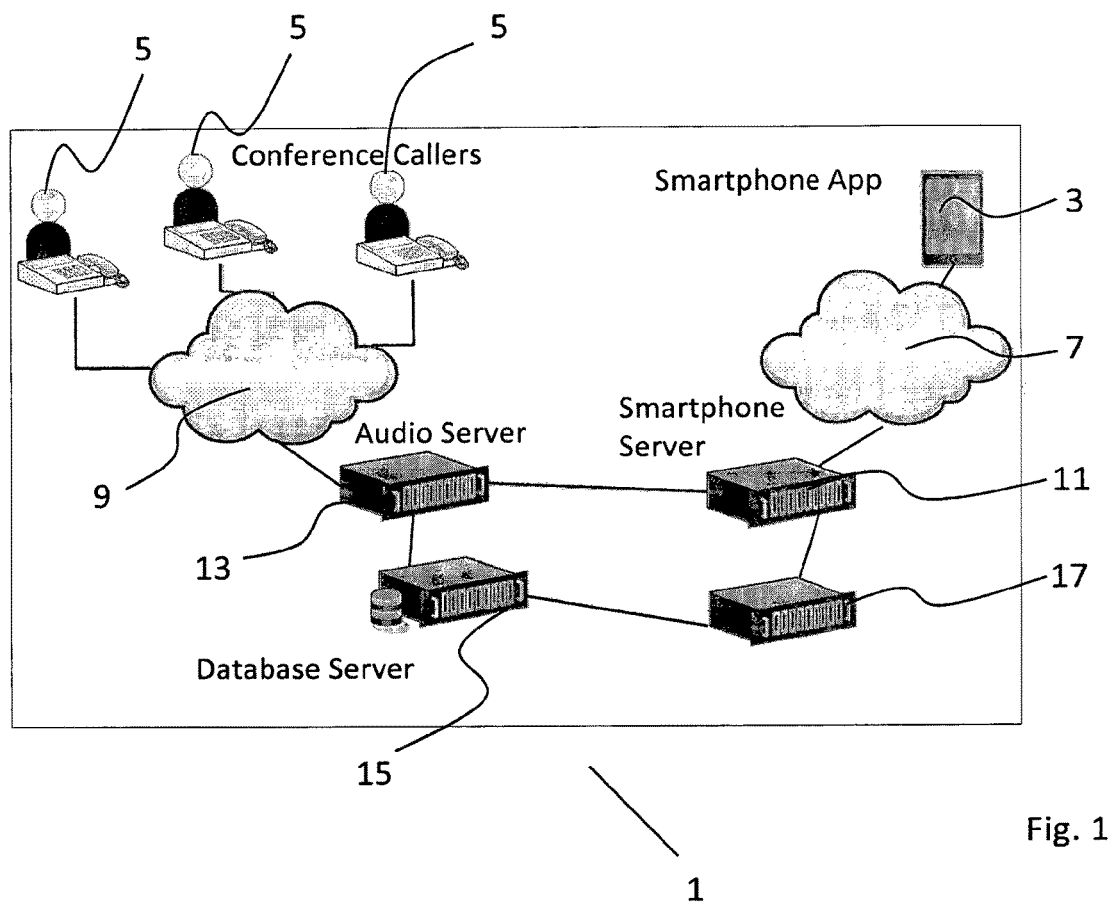
FIG. 1 is a diagrammatic representation of a smartphone conferencing system according to the invention.

Referring to FIG. 1, there is shown a smartphone conferencing system, indicated generally by the reference numeral 1, for handling a conference call between a smartphone 3 and a plurality of conference call participants 5 over a communications network 7, 9. The smartphone conferencing system 1 comprises a smartphone server 11, an audio server 13, a database server 15 and a dial-out and permissions rating engine (DPRE) 17.

The smartphone server 11 is arranged to receive a conference call establishment request from a smartphone 3. The conference call establishment request contains contact details relating to a plurality of conference call participants 5 and the smartphone server is operable to establish a communication link through the communication network 7, 9 between the smartphone 3 and each of the conference call participants 5. The audio server 13 is operable to splice the audio feed from each of the smartphone 3 and the conference call participants 5 into a conference call feed and deliver that conference call feed to each of the smartphone 3 and the conference call participants 5. The database server 15 is used to store data relating to the smartphone user's account and data relating to one or more of the smartphone 3, the conference call participants 5, a plurality of call tariffs, and the conference call feed thereon.

The DPRE 17 is in communication with both the database server 15 and the smartphone server 11. The DPRE comprises means to receive the conference call establishment request forwarded from the smartphone server 3, means to analyse the conference call establishment request to detect valid conference call requests and invalid conference call requests, and means to instruct the smartphone server 11 to accept and process or reject the conference call establishment request based on the analysis of the conference call establishment request.

In use, a smartphone user will transmit a conference call establishment request to the smartphone server 11. The smartphone server will forward the request to the DPRE which will in turn analyse the conference call establishment request to see if it is a valid request or an invalid request. The DPRE may examine the conference call participants and determine based on those participants whether or not the request is valid. If, for example, it is determined that the conference call establishment request contains two conference call participants that were previously called in a conference call by the smartphone user and the bill for that conference call was paid, the conference call establishment request will be considered to be valid. This may be even though other conference call parties in the conference call establishment request were not previously called. Similarly, one or more of the other conference call participants may be in a prohibited or known high risk location but the call will still be processed as the other conference call participants are known and the call as a whole is passed as valid.

Similarly, if all of the conference call participants are not known and one or more of the conference call participants is in an area that is a prohibited or known high risk location, or in other words a known telecoms fraud area, the call may be deemed invalid and blocked in whole or partially. If the conference call establishment request is blocked in whole, an alert may be sent out to the smartphone user and a company contact about a potential fraud and a request for them to contact the service provider in order to fulfill the conference call establishment request. If the conference call establishment request is rejected partially, then some of the conference call participants may be connected to the conference call and others that are not connected may either be simply not connected or may be sent a communication to notify them of the conference call and provide them with details of how they can call into the conference call at their own expense.

Of significant importance is the ability of the DPRE to analyse the conference call establishment request and determine which of the conference call establishment requests are valid and which are potentially invalid. By identifying more valid calls, the smartphone user will experience less delay in setting up the conference call.

According to the present invention, there is provided a more flexible and detailed analysis of each conference call establishment request than was heretofore the case. With the known systems, a rigid set of rules is applied to the conference call establishment request and if the conference call establishment request does not satisfy any one of those rules, the conference call establishment request will be deemed invalid. This often leads to otherwise valid conference call establishment requests being refused, leading to customer dissatisfaction and loss in revenue. According to the present invention, the DPRE will examine a plurality of different conference call establishment request metrics, each of which may be weighted, and determine subsequent to the evaluation of all the metrics, on the balance of probabilities, whether or not a call is likely to be fraudulent.

For example, the DPRE may examine one or more of the following features of the conference call establishment request:

1) Does the conference call establishment request include numbers of conference call participants in previously identified high risk jurisdictions? If so, this may be a significant factor in determining whether or not to allow the call to be routed to the conference call participant.

2) Was the conference call establishment request issued by a smartphone account configured directly by the service provider? If the smartphone account was configured directly by the service provider as opposed to being established through an App store, this will be an indication that there is a business relationship in existence with the smartphone user or their employer which may affect the decision from the service provider's point of view as to whether or not to risk allowing a potentially fraudulent call to be connected.

3) Was the conference call establishment request issued by a smartphone newly registered to use the application or from an experienced user? If the request was issued by an experienced user, there should be an established payment history in place and the possibility of a fraud being perpetrated by the user will be less than would otherwise be the case. In such instances, the service provided may be willing to take an increased level of risk that the call is fraudulent than they would with a new customer in order to not adversely affect a good client relationship.

4) What is the profile of the smartphone user e.g. is this a corporate account or an individual's account? In the cases of a corporate account, there may be a greater likelihood that the smartphone will make calls to obscure locations and furthermore that the call is not fraudulent and will be paid for.

5) What is the call history of the device? This is a particularly important aspect of the present invention. Has the device called any of the intended call participants before and if so, was the call paid for? If so, this is a strong indication that the call is valid. Does the device normally call at the time of this call or is this call being made at an abnormal time of day? If the call is being made at an abnormal time of day compared to the previous calls made by the device, the call may be fraudulent.

6) What is the default physical location of the smartphone and is it to be expected that the smartphone will be trying to contact conference call participants in their present location from the smartphones default location? For example, if the smartphone's default location is Ireland, it may be expected that the smartphone will wish to contact other smartphone users in the British Isles. However, it is less likely that the smartphone user will wish to contact users in Nigeria. However, if the mobile device's default location is in fact Nigeria, there is nothing untoward or unexpected about the mobile attempting to contact other mobiles in Nigeria. In other words, the default physical location of the smartphone will determine to a degree those locations of the conference call participants where one would expect the smartphone to attempt to arrange a conference call to.

7) Are the number of participants on the call out of the ordinary? For example, is the calling party calling more conference call participants than usual? For example, it may be common for the smartphone user to call up to 5 people at one time. If a call with 25 people is initiated by the smartphone, this may be an indication that the call is fraudulent.

The above metrics are not exhaustive and other metrics could be provided in addition to or instead of those listed above. However, for illustrative purposes, a few examples will be described below using the above metrics as a guide. In use, the call metrics outlined above may be given the following weightings: the location of the intended conference call participants, the call history of the device and the number of call participants may all be given a weighting of 2 whereas all of the other metrics will be given a weighting of 1.

A conference call establishment request is received by the DPRE having the following call characteristics: a relatively new user, with a default location in Ireland, with a personal pay-as-you-go account set up through the Irish App store, wishes to contact forty (40) call participants in Afghanistan and two (2) call participants in Ireland. The DPRE will "score" each of the metrics before comparing the score with a pre-determined threshold. In the present example, the threshold may be a score of 6 out of 10. If the combined total of the scores of the metrics are equal to or greater than 6, the call will be stopped and the smartphone user will have to provide further credit or provide identity verification in order for the conference call to be established.

First of all, Afghanistan may be considered to be a medium risk location and the call request will score a "1" (out of "2") for the call location. Whether or not a location is considered to be high, medium or low risk may be based on whether or not the country is a country known for telecoms fraud and/or the cost of calls to that country. Secondly, it is determined that the user is not operating a smartphone having a smartphone account configured directly by the service provider but instead downloaded the application directly from the App store and will be scored a "1" (out of "1") for the nature of the system set-up. Furthermore, as the user is a new user without a substantial payment history, they will be assigned a "1" (out of "1") for this metric as well as a "1" (out of "1") for the metric relating to the fact that they are a private rather than a corporate client account and hence are seen as a greater fraud risk. According to the limited call history built up for the smartphone, it may be determined that the user has called at this time in the past but that they have not called Afghanistan before and therefore they may be given a score of "1" (out of "2" available) for call history as it is not entirely out of the norm but is also not entirely standard procedure for the user either. As the device's default location is Ireland and two of the intended call participants are also located in Ireland, that may be considered normal as the account was set up through the Irish App Store and the call metric will be assigned a "0" (out of "1"). Finally, heretofore, the user has called only between 2 and 4 people simultaneously but the current request is for a conference call with 10 people which is entirely out of character. Accordingly, the DPRE be given a score of "2" (out of "2" available). The score of the call in this instance is 7 which is above the threshold value of 6 and therefore the call will be prevented by the system as suspicious and the smartphone user will be contacted to see if the call is genuine and whether the call can be routed with operator assistance.

According to a second example, in this instance again the user is in Ireland however this time the user is a corporate client with a long payment history. In such circumstances, the conference call payment request will be assigned a score of "0" (out of "1") for this metric as well as a "0" (out of "1") for the metric relating to the fact that they are a corporate rather than a private client account and hence are seen as a lesser fraud risk. All other metrics are the same as the previous example. In such circumstances, the conference call establishment request will achieve a combined score of 5 which is less than the threshold value of 6 and therefore the call will proceed.

According to a third example, in which the conditions are similar to the second example, it may be determined that the call is not during normal office hours and instead is at 2 am in the morning. As the smartphone has not called at this late hour before, and as they have not called Afghanistan before, the call will be scored a "2" (out of "2" available) for call history, resulting in a combined score of 6 which is equal to the threshold and an alarm will be raised. It will be understood from the foregoing that the weightings and the thresholds may be set in the manner required by a system administrator to vary the level of sensitivity, and by extension risk of fraud, that the client and the service provider are willing to bear.

According to the present invention, the alarms may take several different forms. The alarm conditions and actions may also vary depending on the severity of the alarm conditions. For example, if a conference call attempt is made over the weekend (outside office hours) trying to call 15 separate lines in India at a premium rate, and when the smartphone has never called India before and has at most only made calls with four separate participants on the line, the call will be stopped and in order for the call to be established, the smartphone user may have to contact a service provider and answer security questions or provide sufficient credit in an account before the call is allowed to proceed. Similarly, if the call is made to Afghanistan to 2 other parties at a premium rate, the alarm condition may simply be to notify that the call must be authorized by clicking on a link sent to a corporate email account of the smartphone's regular user and/or a notification that additional credit will be required in the account for a pre-pay account.

The DPRE will be embodied in a server or like computing device. The DPRE will comprise a number of software components or modules operating on the server, such as, but not limited to a rules engine containing rules according to which the calls are handled, a communications module for communication with other devices and servers, a world clock providing accurate time and date information for a number of jurisdictions for use in the implementation of the rules, a processor for analysing call data and applying rules to the rules data and an accessible database for storage of customer account data such as customer profiles and also for storage of billing information. Other software components or hardware components may be provided instead of or in addition to one or more of the components outlined above. The rules engine in particular is an important aspect of the present invention and it effectively contains the rules according to which the calls may be handled. The rules engine may be configurable to receive new rules, amend or delete existing rules.

Figure 2:
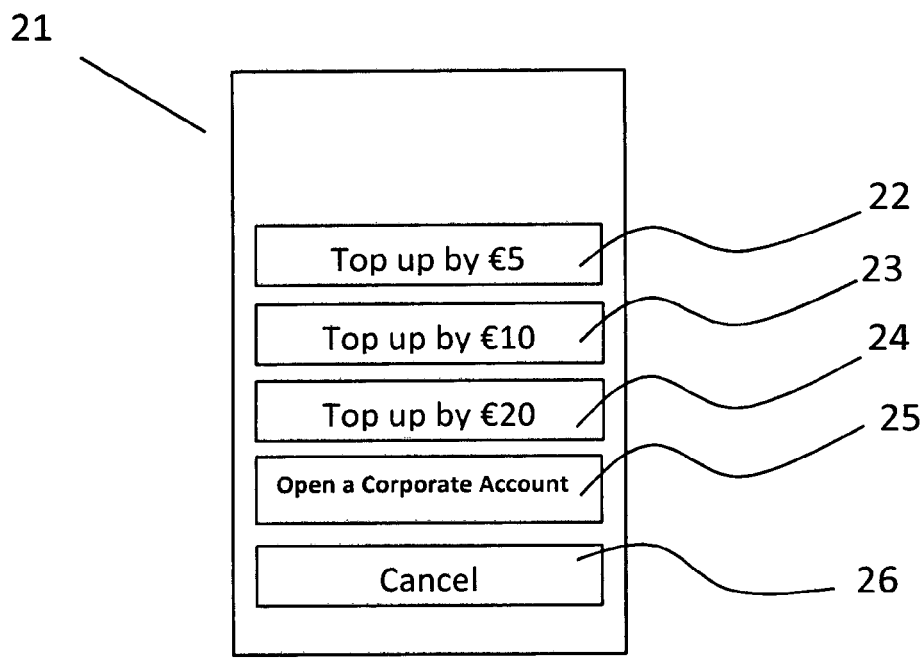
FIG. 2 is a screen shot of a graphical user interface of a smartphone running the conferencing call application.

Referring now to FIG. 2, there is shown a screen shot of a graphical user interface of a smartphone running the conferencing call application, indicated generally by the reference numeral 21. The screen shot 21 illustrates a top-up request that has been transmitted from the DPRE 17 and, in turn, the smartphone server 11 to the smartphone. The conference call app, in this instance, operates on a pay-as-you-go basis rather than on a bill-pay basis. In order to operate in this way, the DPRE monitors the conferencing call account balance of the smartphone and also monitors the cost of the conference call in real time. The DPRE calculates the remaining account balance available to the smartphone user and determines when the conference call app account balance has reached a predetermined level, for example €8.00 or 5 minutes worth (at present rate of expenditure) of remaining call credit. When this first predetermined level is reached, the DPRE will transmit a communication to the smartphone 3 via the smartphone server with a link to the App store (not shown) to top up their account. In the embodiment shown, there are provided four options, a €5 top-up option 22, a €10 top-up option 23, a €20 top-up option 24, an "open corporate account" (effectively a bill-pay account) option 25 and a cancel option 26. Each of the options is provided with a button that may be selected on the smartphone in the known manner of selecting an option on a smartphone. The communication may be accompanied by an aural warning as well if desired. If, for example, the smartphone user selects the €5 top-up option 22, a message will be sent to the App store that the smartphone user wishes to top up their account by €5.

Figure 3:
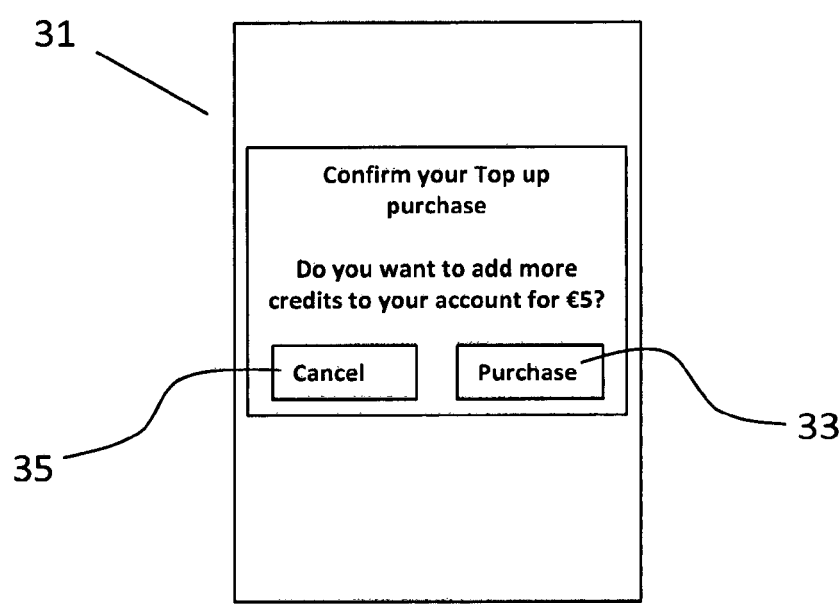
FIG. 3 is another screen shot of a graphical user interface of a smartphone running the conferencing call application.

If the App store receives the top-up request, a confirmation of the top-up will be requested by the App store and a message as illustrated in FIG. 3 will be displayed on the smartphone screen. The graphical user interface 31 will display a message asking the smartphone user to confirm whether or not they wish to top up their account by €5 and the smartphone user will be provided with a pair of option buttons 33, 35. A first option button 33 to purchase the credit and a second option button 35 to cancel the transaction. If the smartphone user wishes to purchase the credit, they will in most cases be requested to confirm their purchase further by providing an App store password or the like to ensure that the account is not being topped up by a person other than the smartphone owner in possession of the smartphone.

Figure 4:
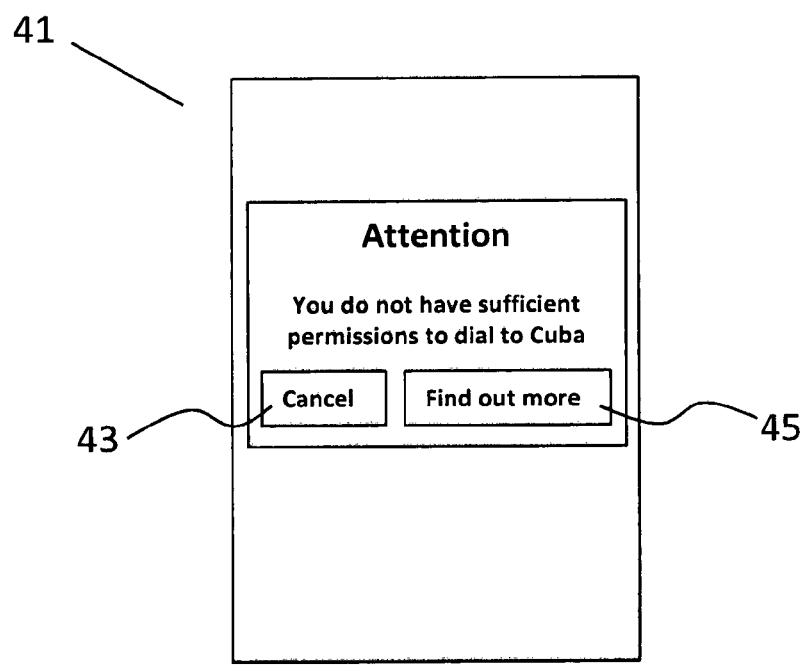
FIG. 4 is a further screen shot of a graphical user interface of a smartphone running the conferencing call application.
Figure 5:
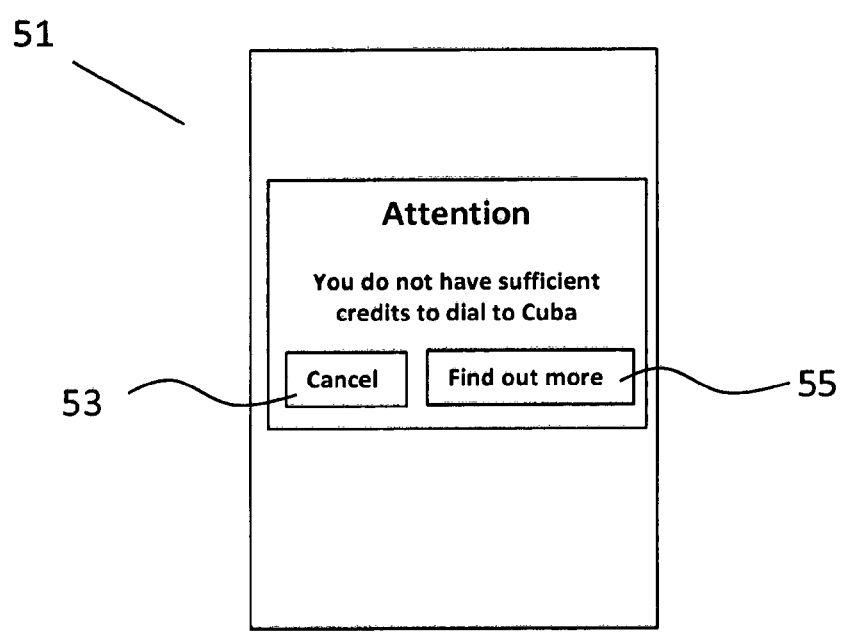
FIG. 5 is a further still screen shot of a graphical user interface of a smartphone running the conferencing call application.

Referring now to FIGS. 4 and 5, there are shown a pair of screen shots 41, 51 respectively, illustrating the safeguards of the system and method according to the invention. Referring specifically to FIG. 4, if the conference call establishment request issued by the smartphone user contains a number in a prohibited or known high risk location (for the purposes of this example only Cuba will be considered to be such a prohibited or known high risk location), an alert will be sent and displayed on the GUI 41 of the smartphone that adequate clearance is required in order to call Cuba. The smartphone user is offered the option buttons 43, 45 for, respectively, cancelling the conference call establishment request or finding out more to remedy the problem and fulfill the call if it is indeed a legitimate conference call establishment request. If it is a legitimate conference call establishment request, the smartphone user can contact customer service and provide sufficient guarantees and pass security measures to enable the conference call establishment request to be fulfilled. Indeed, this may be carried out through a web interface by providing a series of security clearance measures. The security measures may include an email cross-check such as sending a link to a user via email. The user can then click on the link to validate that the email address was indeed their corporate email account. Alternatively, there may be contact with a company contact such as a company administrator or other decision maker that is able to confirm whether the call should be allowed to proceed.

Referring specifically to FIG. 5, there is shown a screen shot 51 displayed to a smartphone user if they have insufficient credit in their account to complete a conference call to a particular jurisdiction. Again, in this instance Cuba is used as an example of the jurisdiction that it is not possible for the smartphone user to complete a conference call with. The smartphone user is offered the option buttons 53, 55 for, respectively, cancelling the conference call establishment request or finding out more to remedy the problem and fulfill the call establishment request. In this case, by selecting the find out more option button 55, the user will be informed of the call rates to Cuba and provided with a link to the App store to update their credit in their account so that they have sufficient funds to complete the conference call.

Various other modifications could be made to the embodiments described above without departing from the spirit of the invention. For example, the system may operate as a bill-pay system in which case, it will not be necessary to top up however suspicious calling patterns will still be detected and fraud will be prevented in many cases.

The call tariffs for each of the conference call participants can be shown in real time on the GUI of the smartphone along with any of the call duration for each conference call participant, the current total call cost for each conference call participant and/or the conference call generally for all participants, the available credit in the smartphone user's conferencing call app account, and the estimated time remaining for the conference call at the present rate of expenditure of the smartphone users conference call app account credit. This will provide the smartphone user with useful information relating to how much the calls are costing them and also how much time they are likely to still have on a call at the present rate of expenditure from their credit and whether or not they need to top-up their account.

In addition to the above, the smartphone user is provided with warnings on their smartphone, either aural or visual or a combination of both, to indicate that their credit is running low (if they are on a pay-as-you-go option) or that the cost of a call has reached a certain limit (if they are on a bill pay option they may wish to monitor this). The warnings that their credit is running low is preferably accompanied by a message that will have links to the App store with instructions to top-up their conference call app account by a predetermined amount. This will speed up the process of topping up their account and will result in minimum disruption to the conference call.

It will be understood that the method according to the present invention will be performed largely in software and therefore the present invention extends also to computer programs, on or in a carrier, comprising program instructions for causing a computer to carry out steps of the method. The computer program may be in source code format, object code format or a format intermediate source code and object code. The computer program may be stored on or in a carrier, in other words a computer program product, including any computer readable medium, including but not limited to a floppy disc, a CD, a DVD, a memory stick, a tape, a RAM, a ROM, a PROM, an EPROM or a hardware circuit.

It will be further understood that the present invention may be performed on two, three or more machines or components with certain parts of the computer-implemented method being performed by one machine or component and other parts of the computer-implemented method being performed by another machine or component. The devices may be part of a LAN, WLAN or could be connected together over a communications network including but not limited to the internet. One or more of the method steps could be performed "in the cloud", meaning that remotely located processing power may be utilised to process certain method steps of the present invention. Accordingly, it will be understood that many of the method steps may be performed remotely, by which it is meant that the method steps could be performed either on a separate machine in the same locality or jurisdiction or indeed on a separate machine or machines in one or several remote jurisdictions. For example, the smartphone server, the audio server, the database and the DPRE may be in one jurisdiction or located in different jurisdictions. The present invention and claims are intended to also cover those instances where the method is performed across two or more machines or pieces of apparatus located in one or more jurisdictions and those situations where the parts of the system are spread out over one or more jurisdictions.

In this specification the terms "include, includes, included and including" and the terms "comprise, comprises, comprised and comprising" are all deemed totally interchangeable and should be afforded the widest possible interpretation.

The invention is in no way limited to the embodiment hereinbefore described but may be varied in both construction and detail within the scope of the appended claims.

The invention claimed is:

1. A smartphone conferencing system for handling a conference call between a smartphone and a plurality of conference call participants over a communications network, the smartphone conferencing system comprising:
   a smartphone server for receiving a conference call establishment request from a smartphone containing contact details relating to a plurality of conference call participants and establishing a communication link through the communication network between the smartphone and each of the conference call participants;
   an audio server for splicing the audio feed from each of the smartphone and the conference call participants into a conference call feed and delivering that conference call feed to each of the smartphone and the conference call participants;
   a database server for storage of data relating to the smartphone users account and data relating to one or more of the smartphone, the call participants, a plurality of call tariffs, and the conference call feed thereon; and
   a dial-out and permissions rating engine (DPRE) in communication with both the database server and the smartphone server, the DPRE comprising:
      means to receive the conference call establishment request forwarded from the smartphone server;
      means to analyse the conference call establishment request to detect valid conference call establishment requests and invalid conference call establishment requests including means to compare a conference call dial-out history of the smartphone user with the conference call establishment request; and
      means to instruct the smartphone server to accept and process or reject the conference call establishment request based on the analysis of the conference call establishment request.

2. The smartphone conferencing system for facilitating a conference call as claimed in claim 1 in which the means to compare the conference call dial-out history of the smartphone user with the conference call establishment request further comprises means to compare the conference call participants listed in the conference call establishment request with conference call participants from previously executed conference calls made by the smartphone.

3. The smartphone conferencing system for facilitating a conference call as claimed in claim 1 in which the means to compare the conference call dial-out history of the smartphone user with the conference call establishment request further comprises means to compare the time of the conference call establishment request with the time of previously executed conference calls made by the smartphone.

4. The smartphone conferencing system for facilitating a conference call as claimed in claim 1 in which the means to analyse the conference call establishment request comprises means to compare the location of the plurality of conference call participants with a location on a prohibited or known high risk location list.

5. The smartphone conferencing system for facilitating a conference call as claimed in claim 1 in which the means to analyse the conference call establishment request comprises means to score each of a plurality of conference call establishment request metrics;
  means to combine the scores of the plurality of conference call establishment request metrics; and
  means to compare the combined scores of the plurality of conference call establishment request metrics to a threshold value.

6. A dial-out and permissions rating engine (DPRE) for use in a smartphone conferencing system for authorizing a conference call between a smartphone and a plurality of conference call participants over a communications network, the DPRE comprising:
  means to receive a conference call establishment request forwarded from a smartphone server;
  means to analyse the conference call establishment request to detect valid conference call establishment requests and invalid conference call establishment requests including means to compare a conference call dial-out history of the smartphone user with the conference call establishment request; and
  means to instruct the smartphone server to accept and process or reject the conference call establishment request based on the analysis of the conference call establishment request.

7. The DPRE as claimed in claim 6 in which the means to compare the conference call dial-out history of the smartphone user with the conference call establishment request further comprises means to compare the conference call participants listed in the conference call establishment request with conference call participants from previously executed conference calls made by the smartphone.

8. The DPRE as claimed in claim 6 in which the means to compare the conference call dial-out history of the smartphone user with the conference call establishment request further comprises means to compare the time of the conference call establishment request with the time of previously executed conference calls made by the smartphone.

9. The DPRE as claimed in claim 6 in which the means to analyse the conference call establishment request comprises means to compare the location of the plurality of conference call participants with a location on a prohibited or known high risk location list.

10. The DPRE as claimed in claim 6 in which the means to analyse the conference call establishment request comprises:
  means to score each of a plurality of conference call establishment request metrics;
  means to combine the scores of the plurality of conference call establishment request metrics; and
  means to compare the combined scores of the plurality of conference call establishment request metrics to a threshold value.

11. A method of handling a smartphone conference call between a smartphone and a plurality of conference call participants over a communications network, the method comprising the steps of:
  a smartphone server receiving a conference call establishment request from a smartphone;
  the smartphone server passing the conference call establishment request on to a dial-out and permissions rating engine (DPRE);
  the DPRE analysing the conference call establishment request to detect whether the conference call establishment request is a valid conference call establishment request or an invalid conference call establishment request; and
  the DPRE instructing the smartphone server to accept and process or reject the conference call establishment request depending on whether the conference call establishment request is a valid conference call establishment request or an invalid conference call establishment request; and
  in which the step of analysing the conference call establishment request comprises comparing a conference call dial-out history of the smartphone user with the conference call establishment request.

12. The method of handling a smartphone conference call as claimed in claim 11 in which the step of comparing the conference call dial-out history of the smartphone user with the conference call establishment request further comprises comparing the conference call participants listed in the conference call establishment request with conference call participants from previously executed conference calls made by the smartphone.

13. The method of handling a smartphone conference call as claimed in claim 11 in which the step of comparing the conference call dial-out history of the smartphone user with the conference call establishment request further comprises comparing the time of the conference call establishment request with the time of previously executed conference calls made by the smartphone.

14. The method of handling a smartphone conference call as claimed in claim 11 in which the step of analysing the conference call establishment request comprises comparing a conference call dial-out history of the smartphone user's known associates with the conference call establishment request.

15. The method of handling a smartphone conference call as claimed in claim 14 in which the step of comparing the conference call dial-out history of the smartphone user's known associates with the conference call establishment request further comprises comparing the conference call participants listed in the conference call establishment request with conference call participants from previously executed conference calls made by the smartphone user's known associates.

16. The method of handling a smartphone conference call as claimed in claim 11 in which the step of analysing the conference call establishment request further comprises comparing the location of the plurality of conference call participants with a location on a prohibited or known high risk location list.

17. The method of handling a smartphone conference call as claimed in claim 11 in which the step of rejecting a conference call establishment request comprises connecting less than all of the conference call participants in a conference call.

18. A method of handling a smartphone conference call as claimed in claim 11 in which the step of the DPRE analysing the conference call establishment request to detect whether the conference call establishment request is a valid conference call request or an invalid conference call request comprises the steps of:
  scoring each of a plurality of conference call establishment request metrics;
  combining the scores of the plurality of conference call establishment request metrics;

comparing the combined scores of the plurality of conference call establishment request metrics to a threshold value.

19. A method of handling a smartphone conference call as claimed in claim 11 comprising the step of the DPRE transmitting an account top-up notification to a smartphone during a conference call.

20. A computer program product having program instructions loaded thereon for causing a computer to carry out the method of claim 11.

* * * * *